(12) United States Patent
Subasic et al.

(10) Patent No.: US 6,721,734 B1
(45) Date of Patent: Apr. 13, 2004

(54) METHOD AND APPARATUS FOR INFORMATION MANAGEMENT USING FUZZY TYPING

(75) Inventors: Pero Subasic, Pittsburgh, PA (US); Alison Huettner, Pittsburgh, PA (US)

(73) Assignee: Claritech Corporation, Pittsburgh, PA (US)

( * ) Notice: Subject to any disclaimer, the term of this patent is extended or adjusted under 35 U.S.C. 154(b) by 0 days.

(21) Appl. No.: 09/551,013

(22) Filed: Apr. 18, 2000

(51) Int. Cl.$^7$ .............................................. G06F 17/30
(52) U.S. Cl. ................. 707/5; 707/6; 706/55; 704/9; 704/10
(58) Field of Search ......................... 707/1–10; 704/9, 704/10; 715/530, 531, 532; 706/1, 3, 48, 55

(56) References Cited

U.S. PATENT DOCUMENTS

| | | | | |
|---|---|---|---|---|
| 5,490,061 A | * | 2/1996 | Tolin et al. .................... | 704/2 |
| 5,940,821 A | * | 8/1999 | Wical ............................. | 707/3 |
| 5,963,940 A | * | 10/1999 | Liddy et al. ................... | 707/5 |
| 6,223,150 B1 | * | 4/2001 | Duan et al. .................... | 704/9 |
| 6,332,143 B1 | * | 12/2001 | Chase ......................... | 707/100 |
| 6,389,415 B1 | * | 5/2002 | Chase ........................... | 707/5 |
| 6,408,266 B1 | * | 6/2002 | Oon ............................... | 704/1 |
| 6,427,137 B2 | * | 7/2002 | Petrushin .................... | 704/273 |

OTHER PUBLICATIONS

"The Use of Lexicons in Information retrieval in Legal Databases"—JC Smith—ICAIL–97, Melbourne, Australia, 1997–ACM, (pps 29–38).*

"The Function of Semantics in Automated Language Processing"—Milos Pacak and Arnold W. Pratt—1971—ACM, (pps: 5–18).*

"Can we treat pragmatics like semantics?"—Barone, J.M. and Dewan, p. 2002—IEEE (pps: 134–139).*

"Mining the Peanut Gallery: Opinion Extraction and Semantic Classification of Product Reviews"—Kushal Dave, Steve Lawrenc and David M. Pennock ACM– 2003 (pps: 519–528).*

* cited by examiner

Primary Examiner—Kim Vu
Assistant Examiner—Ahn Ly
(74) Attorney, Agent, or Firm—Jones Day; Blaney Harper; Russell Paige (57) ABSTRACT

A technique for analyzing affect in which ambiguity in both emotion and natural language is explicitly represented and processed through fuzzy logic. In particular, textual information is processed to i) isolate a vocabulary of words belonging to an emotion, ii) represent the meaning of each word belonging to that emotion using multiple categories and scalar metrics, iii) compute profiles for text documents based on the categories and scores of their component words, and iv) manipulate the profiles to visualize the texts. The representation vehicle in the system is a set of fuzzy semantic categories (affect categories) followed by their respective centralities (degrees of relatedness between lexicon entries and their various categories) and intensities (representative of the strength of the affect level described by that word) called an affect set. A graphical representation of the affect set can also be used as a tool for decision making.

21 Claims, 6 Drawing Sheets

METHOD AND APPARATUS FOR INFORMATION MANAGEMENT USING FUZZY TYPING

FIELD OF THE INVENTION

The present invention relates to the field of computerized search and retrieval systems. More particularly, this invention relates to a method and apparatus for characterizing and retrieving information based on the affect content of the information.

BACKGROUND OF THE INVENTION

Advances in electronic storage technology have resulted in the creation of vast databases of documents stored in electronic form. These databases can be accessed from remote locations around the world. Moreover, information is not only stored in electronic form but it is created in electronic form and disseminated throughout the world. Sources for the electronic creation of such information includes news and periodicals, as well as radio, television and Internet services. All of this information is also made available to the world through computer networks, such as the worldwide web, on a real time basis. As a result, vast amounts of information are available to a wide variety of individuals. The problem with this proliferation of electronic information, however, is the difficulty of accessing useful information in a timely manner. More particularly, how can these vast sources of information be personalized and used in decision support.

To assist in this effort, an analysis of the characteristics of textual information and an intuitive presentation to the user of those characteristics become increasingly important. For example, to match an individual user's interest profile on the worldwide web, it would be particularly useful to understand how the user felt about various topics. The information from which this judgment is made, however, is simply text (or associated voice or video signals converted to a text format) without an associated characterization. We can, however, introduce a human emotional dimension into textual understanding and representation. The analysis of the human emotional dimension of the textual information is referred to as affect analysis. Affect analysis of a text, however, has two sources of ambiguity: i) human emotions themselves and ii) words used in the natural language. The results of the analysis must be conveyed to the user in a form that allows the user to visualize the text affect quickly. In this way, responses to a web user's interest profile may be personalized on a real-time basis.

OBJECTS OF THE PRESENT INVENTION

It is an object of the present invention to provide a method and apparatus for extracting information from data sources.

It is another object of the present invention to extract information from data sources by analyzing the affect of the information.

It is still another object of the present invention to extract information from data sources by analyzing the affect of information and creating a graphical representation of that affect.

It is still a further object of the present invention to analyze the affect of information by quantifying the ambiguity in human emotions and the ambiguity in the natural language.

It is still another object of the present invention to combine affect analysis with other characteristics of textual information to improve the characterization of the information.

SUMMARY OF THE INVENTION

The present invention is a technique for analyzing affect in which ambiguity in both emotion and natural language is explicitly represented and processed through fuzzy logic. In particular, textual information is processed to i) isolate a vocabulary of words belonging to one or more emotions, ii) using multiple emotion categories and scalar metrics to represent the meaning of various words, iii) compute profiles for text documents based on the categories and scores of their component words, and iv) manipulate the profiles to visualize the texts. Lexical ambiguity is dealt with by allowing a single lexicon entry (domain word) to belong to multiple semantic categories. Imprecision is handled, not only via multiple category assignments, but also by allowing degrees of relatedness (centrality) between lexicon entries and their various categories. In addition to centralities, lexicon entries are also assigned numerical intensities, which represent the strength of the affect level described by that word.

After the affect words in a document are tagged, the fuzzy logic part of the system handles them by using fuzzy combination operators, set extension operators and a fuzzy thesaurus to analyze fuzzy sets representing affects. Instead of narrowing down or even eliminating the ambiguity and imprecision pervasive in the words of a natural language, fuzzy techniques provide an excellent framework for the computational management of ambiguity.

The representation vehicle in the system is a set of fuzzy semantic categories (affect categories) followed by their respective centralities and intensities, called an affect set. An affect set with attached centralities is always treated as a pure fuzzy set, and all fuzzy techniques applicable to fuzzy sets are applied to affect sets. Intensities are handled differently, in a more statistical way, since they involve less ambiguity and imprecision and more quantitative aspects of the text. Graphical representation of the affect set is used as a tool for decision making.

DETAILED DESCRIPTION OF THE INVENTION

Figure 1:
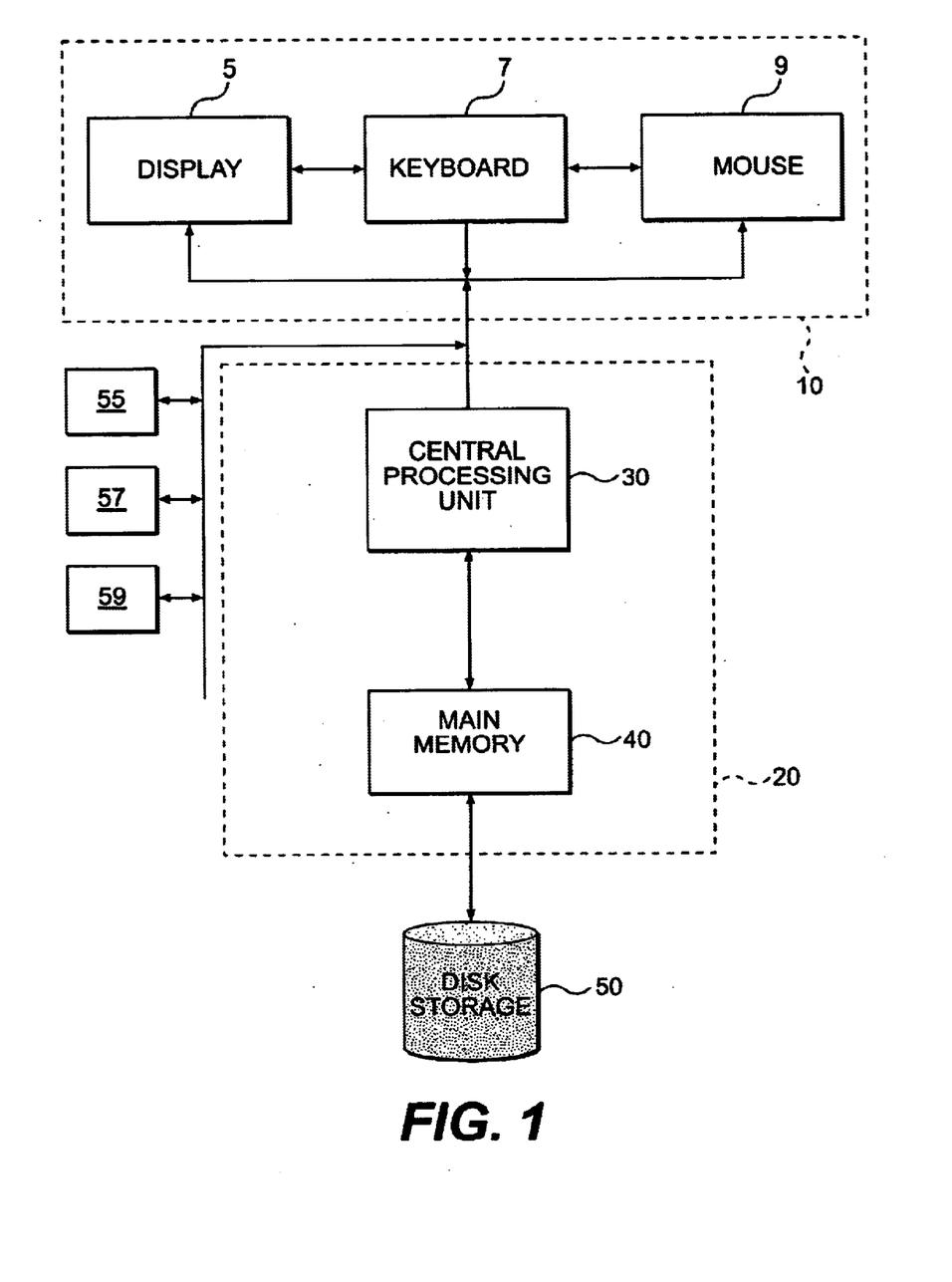
FIG. 1 is a block diagram that illustrates a computer system for performing affect analysis according to one embodiment of the present invention.

FIG. 1 is a block diagram of a computer system used for retrieving information from a database. Computer 20 comprises a central processing unit (CPU) 30 and main memory 40. Computer 20 is connected to an Input/Output (I/O) system 10 and disk storage unit 50. The I/O system 10 includes a display 5, a keyboard 7 and a mouse 9. Furthermore, this computer system is connected to a variety of networks for communicating with other computers and obtaining access to remote databases. Among the networks connected to this computer system is the worldwide web 55, an intranet 57, private external network 59. In general, the disk storage unit 50 stores the program for operating the computer system and it stores the documents of the database. The computer 20 interacts with the IO system 10 and the disk storage unit 50. The computer 20 executes operations according to instructions contained in a program that is retrieved from the disk storage unit 50. This program causes the computer 20 to retrieve the text of documents, or parts thereof, which are stored in a database located either in disk storage 50 or in a storage location accessible over a network. These instructions also cause information received over a network to be distributed to specific individuals over a network based on the content of the information.

Figure 2:
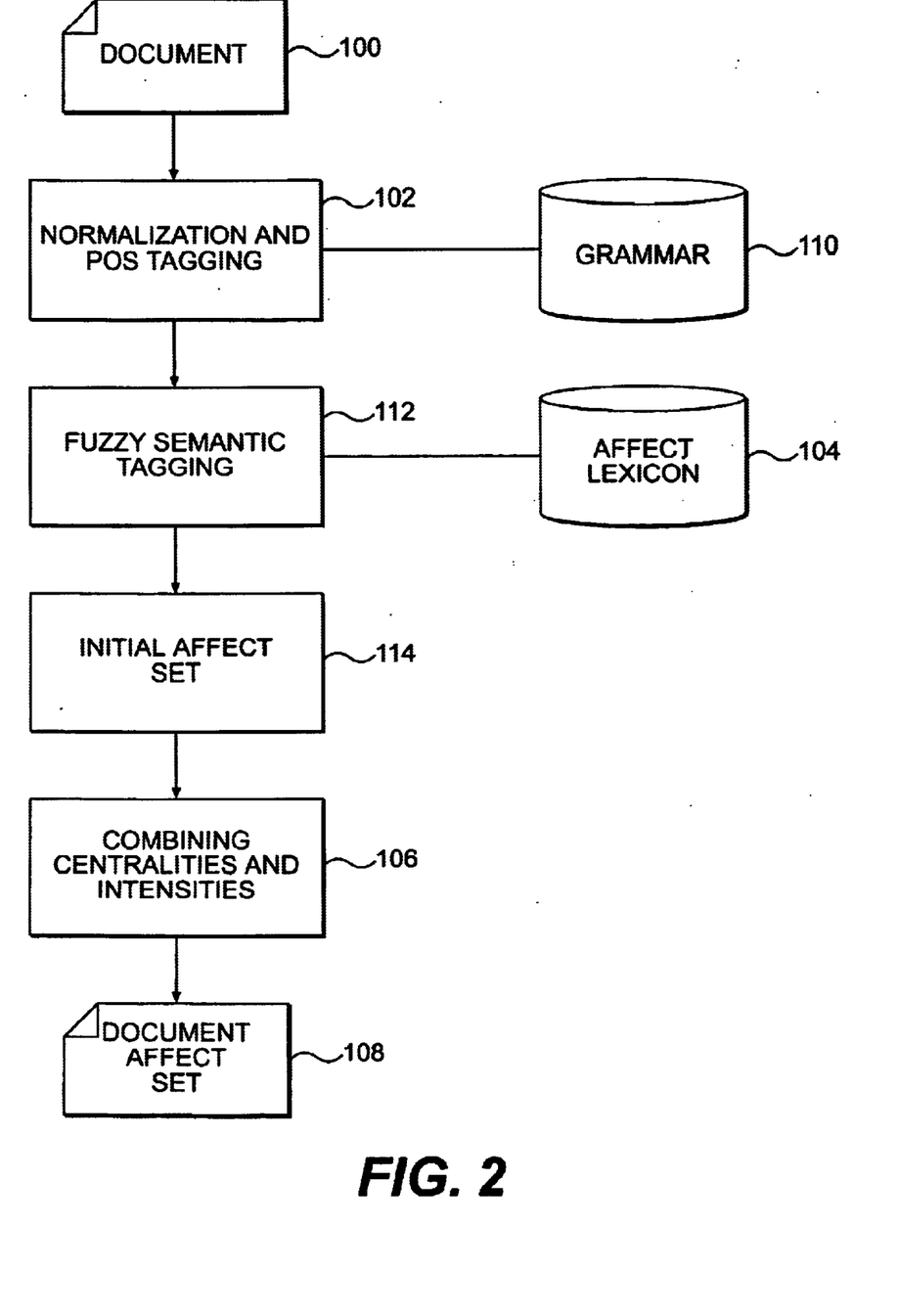
FIG. 2 is a flow chart for carrying out affect analysis according to one embodiment of the present invention.

The process of analyzing the affect of any document in a database according to the present invention requires the generation of an affect set for a document. FIG. 2 illustrates the process for creating a document affect set. An affect set is simply a set of affect categories for a text document with associated centralities and intensities (discussed below). As illustrated in FIG. 2, a document 100 is initially tagged 102. Tagging the document involves parsing the document into individual words and normalizing the words according to the English language using the grammar rules 110. This would involve converting inflected word forms into base forms (e.g., "goes" to "go") by rule or by a listing or look up table. The normalized words are then tagged—that is, associated with category designations and numerical representations. Once the document has been tagged 112, the normalized words are looked up in an affect lexicon 104. If a word has a lexicon entry, that entry and its associated centrality and intensity scores are also selected, tagged and added to the initial affect set 114.

The affect lexicon 104 is a list of words (and associated parameters) that pertain to emotion. The affect lexicon contains entries of the form:

<lexical_entry> <part_of_speech_tag>
<affect_category> <centrality>
<intensity> as in

"arrogance" sn superiority 0.7 0.9.

A lexical entry is a word that has an affectual connotation or denotes affect directly. An affect lexicon is simply a table correlating words with affect entries and having an assigned centrality and intensity. An affect lexicon may be added to directly or from processing documents. An affect lexicon may have 5,000 or more entries.

Since ambiguity sometimes depends on a word's part of speech (POS)—and since NLP processing allows us to differentiate parts of speech in documents—we have included POS information 102 for lexicon entries. For example, the word alert has different category assignments associated with different POS values:

"alert" adj intelligence
 "alert" vb warning

That is, the adjective alert means quick to perceive and act—a kind of intelligence—while the verb alert means to call to a state of readiness—a kind of warning.

A word's POS can affect its centrality or intensity values as well as its category assignment. For example, lexicon entries with POS, categories, and centrality degrees for the word craze include:

"craze" vb insanity 0.8
 "craze" sn insanity 0.5

That is, the verb craze belongs to affect category insanity with a degree of 0.8; the singular noun craze belongs to the same category with a degree of 0.5. This reflects the fact that the verb craze means to make insane or as if insane—very central to the insanity category; while the noun craze means an exaggerated and often transient enthusiasm—i.e., it belongs to insanity only in a less central, more metaphorical sense.

Many affect categories may not strictly involve only affect: for example, deprivation, health, and intelligence are only marginally affects, and death, destruction and justice are not affects at all. Such categories have been created in cases where (a) some significant portion of an affect word's meaning cannot be captured using pure affect categories; and (b) the same meaning component recurred again and again in the vocabulary at issue. For example, a word like corpse certainly entails some affect, and can plausibly be assigned to categories sadness and horror; at the same time, a part of its meaning is obviously being missed by those categorizations. Moreover, words like assassination, cyanide, execute, funeral, genocide, and homicidal share this missing meaning component. In the present invention, there are not-strictly-affect categories to handle such words.

At present, there are 83 affect categories. Each affect category has an explicit opposite, with three exceptions.

1. Centrality degrees range from 0 to 1 by increments of 0.1. A word which belongs to several affect categories will generally have different centralities from category to category, as in this example:

"emasculate" vb weakness 0.7
 "emasculate" vb lack 0.4
 "emasculate" vb violence 0.3

That is, the element of weakness is fairly central in the word emasculate (a rating of 0.7); the notion of a specific lack is also present but less central (rating of 0.4); and an additional element of violence is possible but not really necessary (rating of 0.3).

In assigning centrality, typical questions the developer should answer for each entry/affect category include: To what extent is affect X related to category C? To what extent does affect X co-occur with category C? To what extent can affect X be replaced with category C in the text, without changing the meaning?

Since centralities indicate the presence of a certain quality (represented by the appropriate affect category) for a given lexicon entry, centralities are handled as fuzzy membership degrees.

2. In addition to centralities, lexicon entries are also assigned numerical intensities, which represent the strength of the affect level described by that entry. Intensity degrees, like centrality degrees, range from 0 to 1 by increments of 0.1. Here are some examples (the second number represents the intensity):

"abhor" vb repulsion 1.0 1.0
 "contempt" sn repulsion 0.6 0.7
 "aversion" sn repulsion 0.9 0.5
 "displeasure" sn repulsion 0.3 0.3
 "fat" adj repulsion 0.2 0.1

All of these words have some element or connotation of repulsion. A word like abhor expresses very intense repulsion (as well as being very central to the concept of repulsion); contempt, aversion, and displeasure are progressively less intense on the repulsion scale. A word like fat—which is not at all central to the repulsion concept, as expressed by its low centrality of 0.2, but which has some slight overtones of repulsion to many Americans—is an objective description, hence hardly an affect word at all. This is reflected in its low intensity score of 0.1. In general, scores below 0.4 on both scales tend to be the most subjective and notional.

A word that belongs to several affect categories will generally have different intensities from category to category, as in this example:

"avenge" vb conflict 0.1 0.8

"avenge" vb violence 0.8 0.5

"avenge" vb justice 0.4 0.7

That is, avenge is a high-intensity conflict word, but only a moderate-intensity word with respect to violence; its intensity rating for justice is somewhere in between.

Assigning category labels and membership degrees to lexicon entries is a very subjective process. In the present invention, the assignments have been made by a single linguist. They are obviously influenced by the linguist's own experience, reading background, and (since affects are in question) personal/emotional background and prejudices. Repeated iterations and use of additional profiles or personal lexicons will allow the individual user to fine-tune membership degrees and accommodate his or her own subjective criteria.

The affect lexicon can be expanded through the use of a fuzzy thesaurus. The fuzzy thesaurus is generated by the system from the affect lexicon. It is generated using max-min combination:

$$R(AC_i, AC_j) = \bigvee_{A \in \text{AffectLexicon}} \{C_A(AC_i) \wedge C_A(AC_j)\}$$

where $AC_i$, $AC_j$ are affect categories whose relationship degree $R(AC_i, AC_j)$ we want to compute, and $C_A(AC_i)$, $C_A(AC_j)$ are the centralities of affect categories $AC_i$, $AC_j$ with respect to affect A. $C_A(AC_i)$, $C_A(AC_j)$ is taken directly from the affect lexicon.

The fuzzy thesaurus establishes relationships between pairs of affect categories, based on the centralities of lexical items assigned to both categories in the lexicon. It contains entries of the form:

<affect_category_1>,

<affect_category_2>,

<relationship_degree> as in attraction, love, 0.8 arranged in a matrix. When the relationship degree is equal to 0, no entry is recorded in the fuzzy thesaurus. When the relationship degree is equal to 1.0, we say that we have discovered affectual synonyms, as in conflict, violence, 1.0 pain, harm, 1.0

Non-synonymous pairs having entries in the matrix are related to some specified degree.

The fuzzy thesaurus is primarily used for expansion of affect sets. For example, if an affect set consists of love/0.7, and the user opts to expand it using the fuzzy thesaurus, related categories such as attraction will be added to the set automatically.

Affect category groups are generated automatically by clustering the fuzzy thesaurus. In this process, affect categories with high similarity degrees (as defined in the fuzzy thesaurus) are grouped together. For example, we might find that love, attraction, happiness, desire and pleasure formed one affect category group, while repulsion, horror, inferiority and pain formed another. If the automatically-created groups are not so intuitively natural as this example, the user can edit them.

In FIG. 2, the initial affect set 114 for the following sentence:

His first film, Un Chien Andalou (1928), co-directed by Salvador Dali, caused an uproar (he filled his pockets with stones, he wrote in his autobiography, so he would have something to throw if the audience attacked him).

could be for example,

"uproar" sn violence 0.6 0.6

"attack" vb violence 0.9 0.8

"attack" vb conflict 0.8 0.7

According to FIG. 2, once the initial affect set has been created 114, the centralities and intensities are combined in step 106.

The following algorithm describes how to reduce the initial affect set by combining the centralities and intensities of recurring categories.

1. For each affect category that appears in the tagging set:

a) Compute the maximal centrality (fuzzy union) of all centralities attached to that affect category in the tagged document. The result is the centrality of that category for the document as a whole.

b) Compute the average intensity of all intensities attached to that affect category in the tagged document. The result is the intensity of that category for the document as a whole.

2. Combine the counts of each affect category with its intensities using simple averaging, to yield the overall intensity score for the document.

As an example, consider the following document:

Luis Bunuel's The Exterminating Angel (1962) is a macabre comedy, a mordant view of human nature that suggests we harbor savage instincts and unspeakable secrets. Take a group of prosperous dinner guests and pen them up long enough, he suggests, and they'll turn on one another like rats in an overpopulation study. Bunuel begins with small, alarming portents. The cook and the servants suddenly put on their coats and escape, just as the dinner guests are arriving. The hostess is furious; she planned an after-dinner entertainment involving a bear and two sheep. Now it will have to be canceled. It is typical of Bunuel that such surrealistic touches are dropped in without comment. The dinner party is a success. The guests whisper slanders about each other, their eyes playing across the faces of their fellow guests with greed, lust and envy. After dinner, they stroll into the drawing room, where we glimpse a woman's purse, filled with chicken feathers and rooster claws.

After fuzzy semantic tagging, the following output is produced:

macabre, adj, death, 0.50, 0.60 macabre, adj, horror, 0.90, 0.60 comedy, sn, humor, 1.00, 0.60 mordant, adj, pain, 0.3, 0.5 mordant, adj, clarity, 0.4, 0.8 savage, adj, violence, 1.00, 1.00 instinct, sn, intelligence, 0.50, 0.20 instinct, sn, innocence, 0.40, 0.60 secret, sn, slyness, 0.50, 0.50
secret, sn, deception, 0.50, 0.50
prosperous, adj, surfeit, 0.50, 0.50
rat, sn, disloyalty, 0.30, 0.90
rat, sn, horror, 0.20, 0.60
rat, sn, repulsion, 0.60, 0.70
alarm, vb, fear, 0.60, 0.50
alarm, vb, warning, 0.70, 0.70
alarm, vb, excitement, 0.80, 0.80
portent, sn, promise, 0.70, 0.90
portent, sn, warning, 1.00, 0.80
escape, vb, aversion, 0.90, 0.60
furious, adj, violence, 0.80, 0.90
furious, adj, anger, 1.00, 0.80
entertainment, sn, pleasure, 0.7, 0.6
cancel, vb, failure, 0.30, 0.50
cancel, vb, lack, 0.50, 0.40
surrealistic, adj, absurdity, 0.80, 0.50
surrealistic, adj, creation, 0.30, 0.40
surrealistic, adj, insanity, 0.50, 0.30
surrealistic, adj, surprise, 0.30, 0.30
success, sn, success, 1.00, 0.60
whisper, vb, slyness, 0.40, 0.50
whisper, vb, slander, 0.40, 0.40
slander, vb, slander, 1.0, 0.9
play, vb, creation, 0.30, 0.30
play, vb, pleasure, 0.70, 0.50
play, vb, innocence, 0.20, 0.40
greed, sn, desire, 0.60, 1.00
greed, sn, greed, 1.00, 0.70
lust, vb, desire, 0.80, 0.90
envy, sn, desire, 0.7, 0.6
envy, sn, greed, 0.7, 0.6
envy, sn, inferiority, 0.4, 0.4
envy, sn, lack, 0.5, 0.5
envy, sn, slyness, 0.5, 0.6
fill, sn, surfeit, 0.70, 0.40

After tagging, recurring affect categories are combined into a set of unique tags, with centralities and intensities that accurately reflect the overall document content. For that purpose, the original affect words and the POS information are discarded, and the intensities and centralities of the remaining affect categories are combined.

Intensities and centralities are handled differently, since they represent different types of information. Centrality indicates the purity of a quality represented by an affect category. Intensity indicates the strength of that quality. Thus the number of occurrences of a particular affect category in a document does not affect its centrality, but does affect its intensity. Centrality, as the purity of a quality, depends on the maximal centrality over all instances of that affect category in a particular document. That is to say, the maximal purity of the quality in the document already implies vaguer or more diluted degrees of that quality, and is therefore appropriate as the combined centrality/purity for that category. The appropriate operation here is thus fuzzy union. On the other hand, the more times an affect category is present in the document, and the higher the intensities of its instances, the higher will be the combined intensity/strength attached to it. The intensity attached to an affect category is computed as a simple average of all the intensities attached to the affect category's instances.

After computing centralities using fuzzy union, and arranging elements so that the elements with higher membership degrees (centralities) are at the front of the fuzzy set, the fuzzy set is represented by:

$$\frac{violence}{1.0} + \frac{humor}{1.0} + \frac{warning}{1.0} + \frac{anger}{1.0} + \frac{success}{1.0} + \frac{slander}{1.0} + \frac{greed}{1.0} +$$
$$\frac{horror}{0.90} + \frac{aversion}{0.90} + \frac{absurity}{0.80} + \frac{excitement}{0.80} + \frac{desire}{0.80} + \frac{pleasure}{0.70} +$$
$$\frac{promise}{0.70} + \frac{surfeit}{0.70} + \frac{repulsion}{0.60} + \frac{fear}{0.60} + \frac{lack}{0.50} + \frac{death}{0.50} + \frac{slyness}{0.50} +$$
$$\frac{intelligence}{0.50} + \frac{deception}{0.50} + \frac{insanity}{0.50} + \frac{clarity}{0.40} + \frac{innocence}{0.40} +$$
$$\frac{inferiority}{0.40} \frac{pain}{0.30} + \frac{disloyalty}{0.30} + \frac{failure}{0.30} + \frac{creation}{0.30} + \frac{surprise}{0.30}$$

This form of representation for the fuzzy set of affect categories enables us easily to spot predominant affects in the document. The meaning of this affect category set is that the document has a high degree of violence, humor, warning, anger, success, slander, greed, horror, aversion, absurdity, excitement, desire, pleasure, promise and surfeit; a medium degree of repulsion, fear, lack, death, slyness, intelligence, deception, insanity, clarity, innocence and inferiority; and a low degree of pain, disloyalty, failure, creation and surprise.

Other metrics for the document can also be computed. For example, a simple weighted average over all affect category instances and their respective intensities may be used to compute overall intensity:

$$I(D) = \sum_{j=1}^{N} \frac{I(ACI_j)}{N},$$

where $I(D)$ is overall intensity of a document D, N is the total number of affect category instances in the document D, and $I(ACI_j)$ is the intensity of an affect category instance $ACI_j$. For a given document, overall intensity is 0.597. Overall intensity is used to detect documents with offensive content. For example, high overall intensity (over 0.7) in combination with a specific centrality profile $$\left(\frac{distaste}{0.8} + \frac{violence}{0.9} + \frac{pain}{0.8}\right)$$

may indicate offensive and undesirable content.

Also, the affect quotient shows the percentage of the document that contains affect words, with respect to the whole document. The whole document is considered to be the total number of words that normalize to a singular noun, verb or adjective (i.e., the set of content words).

Still further, the cardinality of an affect set is computed as the sum of all centralities of the affect categories composing that affect set:

$$card(D_i) = \sum_{j=1}^{N_i} C(AC_{i,j}).$$

For a document affect set, this number can give us a measure of the abundance of particular feelings for comparison with the cardinalities of other documents. Depending on the content, it may indicate sophistication of expression on the part of the document's author, depth and intricacy of feelings, detail of description, etc.

Additionally, the fuzziness of an affect set indicates how balanced the centralities or intensities of the affect categories are. It is computed using:

$$F(D_i) = \frac{\text{card}(A \cap \overline{A})}{\text{card}(A \cup \overline{A})},$$

where A denotes an affect set, and $\overline{A}$ denotes its complement. The affect set is assumed to be normalized, which means that maximal centrality of a set is 1.0. The more centralities are close to 0.5, the higher the fuzziness of the affect set. When all centralities are 1.0, the affect set is crisp, and therefore its fuzziness is 0.

Fuzziness shows how balanced the feelings are in an affect set. Fuzziness of 0.0 indicates the same degree of quality for the various feelings in the affect set. It may indicate direct, unambiguous expression of emotion. Fuzziness of 1.0 may indicate a highly ambiguous expression of emotion from a conflicted or uncommitted person.

As illustrated in FIG. 2, once the centralities and intensities have been combined, a complete document affect set 108 has been created. A document affect set is then generated for each document in the database. Specific affect related information extraction can then be performed on the database. In particular, extraction is performed by computing the similarity between the affect set (for each document in the database) and affect profile for a query.

A query, like any other document, can be represented as a set of affect categories with attached centralities and intensities. A complex query may also contain an overall intensity, combined centralities and intensities for each affect category, only a centrality for each affect category, or only an intensity for each affect category.

A query can be composed of any number of affect categories, with associated centralities and intensities. Complex affect categories must be defined using the already available affect categories. An example of a query is:

$$\frac{\text{attractiveness}}{0.7} + \frac{\text{happiness}}{0.8} + \frac{\text{confusion}}{0.9}$$

Raw affects (i.e., not affect categories but ordinary affect words) can be used in queries, with centralities. When an affect word is in neither the personal lexicon nor the general lexicon, the user is asked to define it by using existing affect categories.

Figure 3:
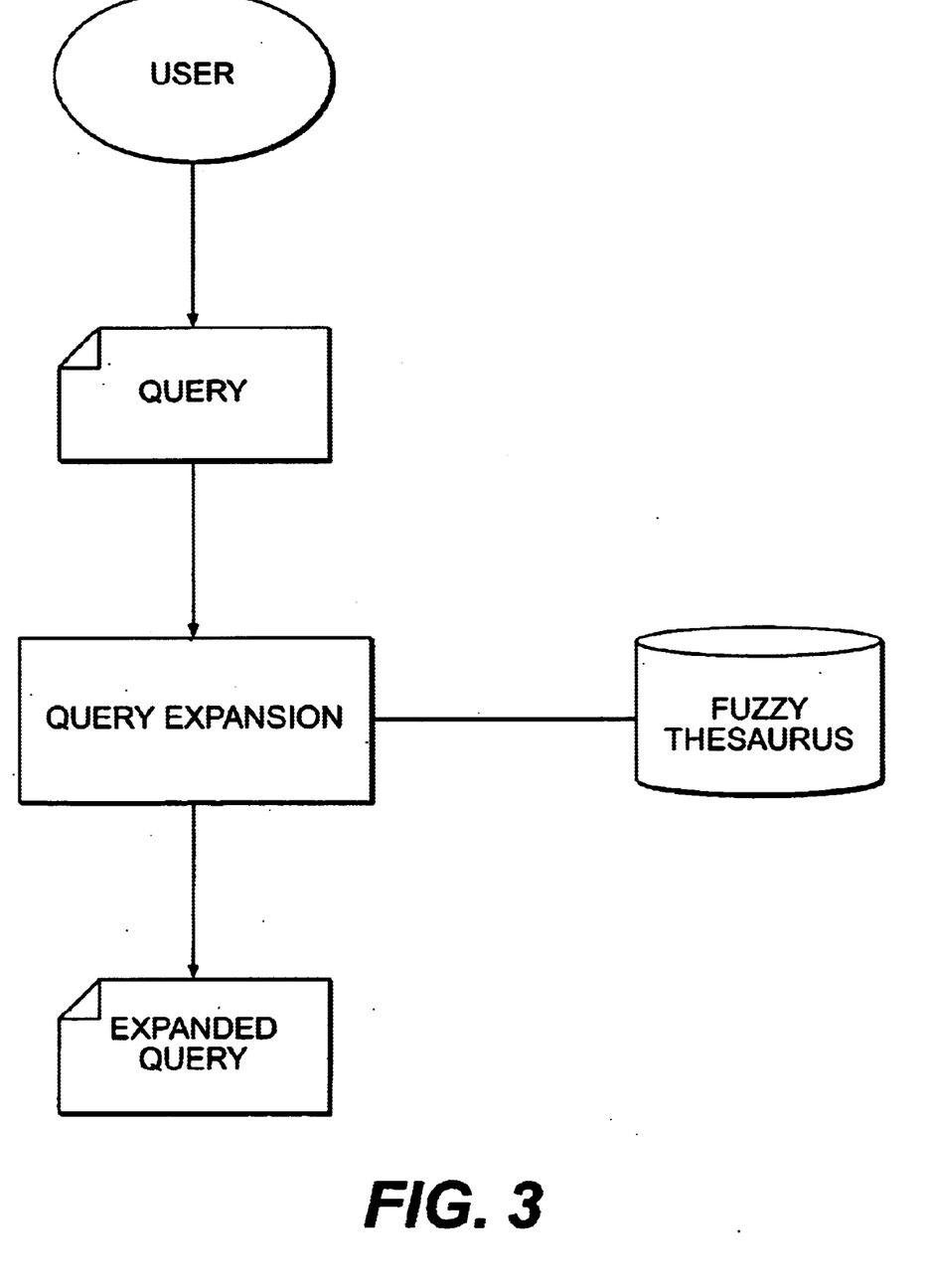
FIG. 3 is a flow chart illustrating a process for query expansion according to one embodiment of the present invention.

Any affect set (query, document affect set, profile) can be expanded using the fuzzy thesaurus at the level of affect categories. The typical operation for expansion is min-max composition, although other composition operations can be used. Query expansion is a particular case of more general affect set expansion. The same method can be applied to any affect set: one representing a document, a profile, or a group of documents. Query expansion is performed using the min-max composition rule for expanding fuzzy queries with a fuzzy thesaurus. FIG. 3 represents this process graphically. As an example, let the relevant part of the fuzzy thesaurus be $$\begin{array}{c} \text{humor} \\ \text{excitement} \\ \text{attractiveness} \\ \text{intelligence} \end{array} \begin{bmatrix} \text{humor} & \text{excitement} & \text{attractiveness} & \text{intelligence} \\ 1.0 & 0.6 & 0.0 & 0.8 \\ 0.6 & 1.0 & 0.9 & 0.7 \\ 0.0 & 0.9 & 1.0 & 0.8 \\ 0.8 & 0.7 & 0.8 & 1.0 \end{bmatrix}$$

Assuming that a user wants to get documents containing humor with a degree of about 0.7:

$$\frac{\text{humor}}{0.7}$$

From the fuzzy thesaurus, using mini-max composition, we expand this query as follows:

$$\frac{\text{humor}}{0.7} \circ \begin{array}{c} \text{humor} \\ \text{excitement} \\ \text{attractiveness} \\ \text{intelligence} \end{array} \begin{bmatrix} \text{humor} & \text{excitement} & \text{attractiveness} & \text{intelligence} \\ 1.0 & 0.6 & 0.0 & 0.8 \\ 0.6 & 1.0 & 0.9 & 0.7 \\ 0.0 & 0.9 & 1.0 & 0.8 \\ 0.8 & 0.7 & 0.8 & 1.0 \end{bmatrix} =$$

$$\frac{\text{humor}}{0.7} \circ \text{humor} \begin{bmatrix} \text{humor} & \text{excitement} & \text{attractiveness} & \text{intelligence} \\ 1.0 & 0.6 & 0.0 & 0.8 \end{bmatrix} =$$

$$\frac{\text{humor}}{0.7} + \frac{\text{excitement}}{0.6} + \frac{\text{intelligence}}{0.7}$$

The resulting fuzzy set represents our expanded query.

This procedure can be represented with a formula:

$$Q_E = Q \circ T,$$

where Q represents the fuzzy query, T the fuzzy thesaurus, $Q_E$ the expanded fuzzy query, and o the composition operation, in this case min-max composition:

$$C_{Q_E} = \bigvee_{AC_x \in X} \{C_Q(AC_x) \wedge RD_T(AC_x, AC_y)\}.$$

In addition to performing information extraction based on centrality, extraction can be performed using intensity as well. An intensity-based query will return documents with intensities greater than or equal to the respective intensities of the affect categories in the query. Only those documents satisfying all intensity constraints are returned. Intensity-based information extraction can be combined with centrality-based extraction. In such a case, intensity-based extraction is carried out first. Then centrality-based extraction is carried out on the returned document set. In other words, the requested intensity acts as a constraint in the second extraction step. Yet another possibility is to extract documents with overall intensity above or below some stated threshold value.

The purpose of fuzzy retrieval is to return all documents that contain affect categories with centrality profiles similar to the centrality profile of the document. Given the expanded query from the previous section, $$Q = \frac{\text{humor}}{0.7} + \frac{\text{excitement}}{0.6} + \frac{\text{intelligence}}{0.7},$$

and this document affect set, $$D_1 = \frac{humor}{1.0} + \frac{superiority}{1.0} + \frac{crime}{1.0} + \frac{intelligence}{0.90} +$$
$$\frac{violence}{0.90} + \frac{excitement}{0.80} + \frac{conflict}{0.80} + \frac{warning}{0.70} + \frac{failure}{0.50} +$$
$$\frac{attractiveness}{0.50} + \frac{security}{0.50} + \frac{distaste}{0.40} + \frac{justice}{0.20} + \frac{fear}{0.20} + \frac{pain}{0.10}$$

the document would be returned by the query.

The degree to which a query is satisfied is computed by using a pair of measures:

$$\Pi(Q, D_i) = \Pi_i = \sup_j \min(Q(a_j), D_i(a_j)), \text{ and}$$

$$N(Q, D_i) = N_i = \inf_j \max(Q(a_j), 1 - D_i(a_j)),$$

where $\Pi_i$ denotes the possibility measure and $N_i$ denotes the necessity measure that document $D_i$ matches the query Q. Using our example, we have $$\Pi(Q, D_i) = \Pi_i = \sup_j[\min(0.7, 1.0), \min(0.6, 0.80),$$
$$\min(0.7, 0.9)) = \sup[0.7, 0.6, 0.7] = 0.7,$$
$$\text{and } N(Q, D_i) = N_i = \inf_j[\max(0.7, 1 - 1.0),$$
$$\max(0.6, 1 - 0.80), \max(0.7, 1 - 0.9)) = \inf[0.7, 0.6, 0.7] = 0.6$$

A pair of threshold values is defined for which a query is satisfied with the formula:

$$(\Pi_t, N_t) = (0.6, 0.4).$$

And, since $(\Pi_i, N_i) > (\Pi_t, N_t)$ (where > is the "pairwise greater than" operator), the document will be returned.

Figure 4:
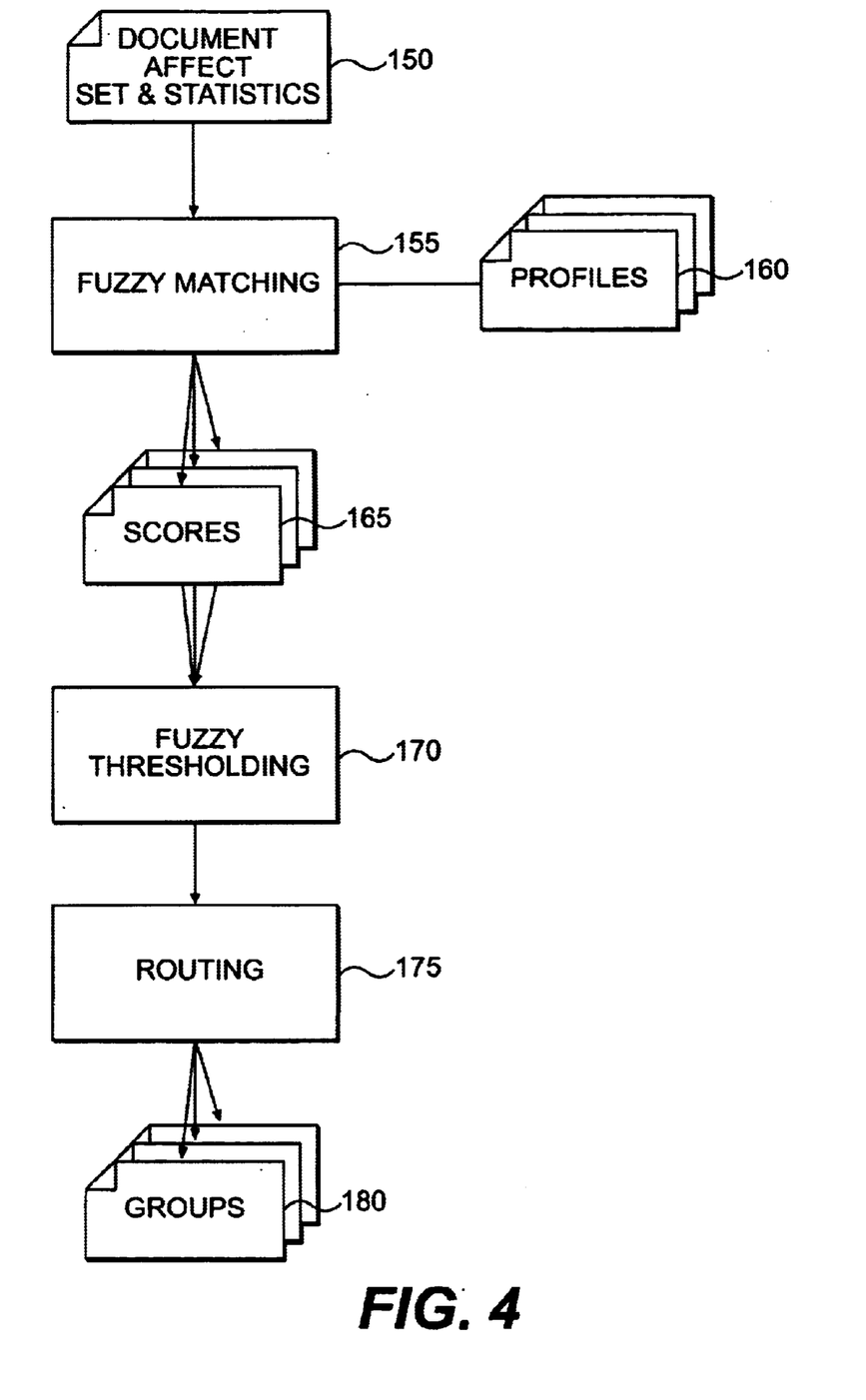
FIG. 4 is a flow chart for carrying out classification analysis according to one embodiment of the present invention.

Fuzzy classification (or filtering) is a process as shown in FIG. 4 in which affect sets from documents 150 are matched 155 with predefined affect profiles 160 containing affect category tags to yield document groupings into different categories. Profiles are described as a list of affect categories with attached centralities and intensities (an affect set). In the process of classification, a single document is matched with a profile using the same method (scoring 165 and thresholding 170) as in fuzzy retrieval. Depending on the goal of classification, a profile can be expanded prior to matching using the query expansion feature. After matching, if the matching criterion described in fuzzy retrieval is satisfied, the document becomes a member of the category (through routing 175 and group 180) described by the current profile.

This classification approach has the following implications.

A document can be routed to multiple categories, and the thresholding mechanism can be fine-tuned to pass documents having different affect structures.

Profiles can be automatically adjusted to reflect the current content of the class represented by that profile.

Clustering can be performed based on:
1. User-defined classification categories (profiles)
2. Centralities for a specific category or a group of categories
3. Intensity degrees for a specific category or group of categories, or overall intensity degrees for the documents Documents containing many affect categories with high intensities may be documents with offensive content, inappropriate for certain groups. Documents with high centralities attached to some affect categories can be also grouped and filtered out, for example documents with a high centrality score for affect category violence.

Information Extraction, Classification and Clustering using affect analysis are particularly applicable to network, internet or multimedia (including audio and video) data sources. For example, using affect analysis on information returned from an internet search engine, that information can be analyzed for its violence affect. To the extent information has a violence centrality and intensity above a defined threshold, that information may be specially routed or not delivered or the source of the information itself tagged for special treatment (i.e., not accessed). This same process is applicable to audio and video files that are tagged or analyzed for their language content.

Additionally, affect analysis can be combined with other information to further improve document characterization. In particular, document structure from punctuation marks can be combined with affect analysis to indicate affect characteristics of different parts of a document. For example, sentences (marked by periods) can be analyzed for affect and then combined. The affect of a plurality of sentences can be combined into an affect for a paragraph (marked by indentations). Paragraph affect can be further combined to section affect wherein each section is defined by topic headings. Furthermore, section affect can be combined to create a document affect and document affects can be combined to describe affect for a database of documents. Other types of document structures such as extracted entities (persons, places, things), typed fields (using pre-existing analysis), quotes, or indices may have assigned affect or affect generated by analysis on the individual structure. These affect characteristics can then be combined with sentence or document affect to further characterize the information being analyzed.

Figure 5:
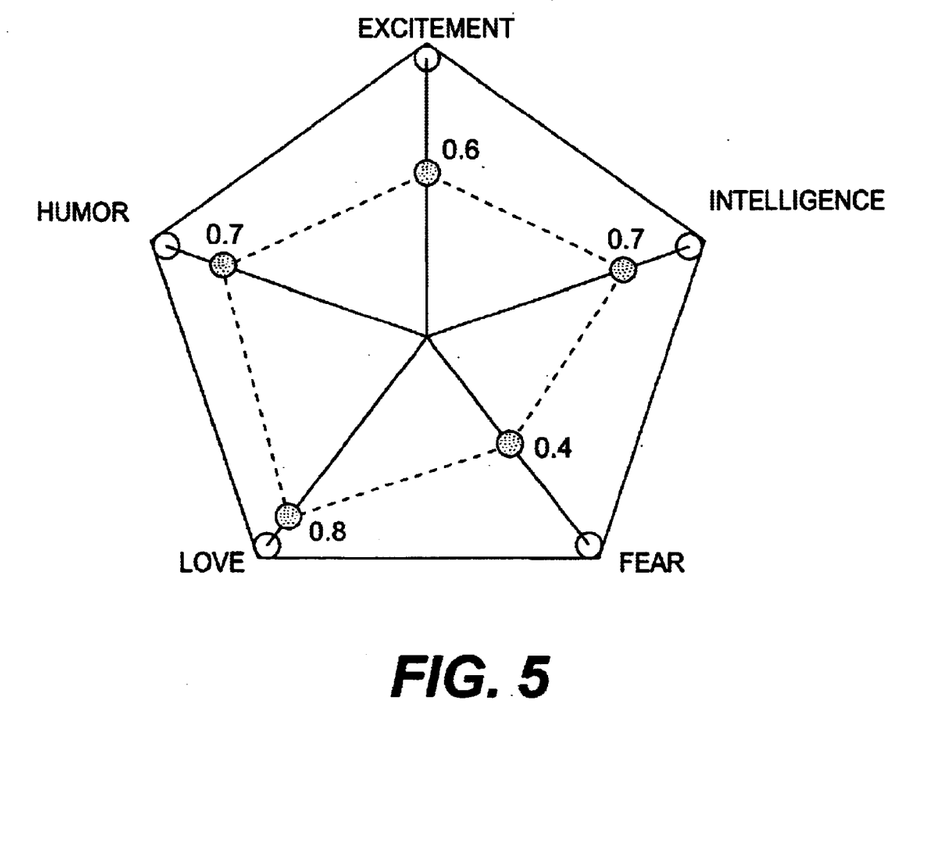
FIG. 5 is a diagram illustrating visualization of the affect analysis according to one embodiment of the present invention.
Figure 6:
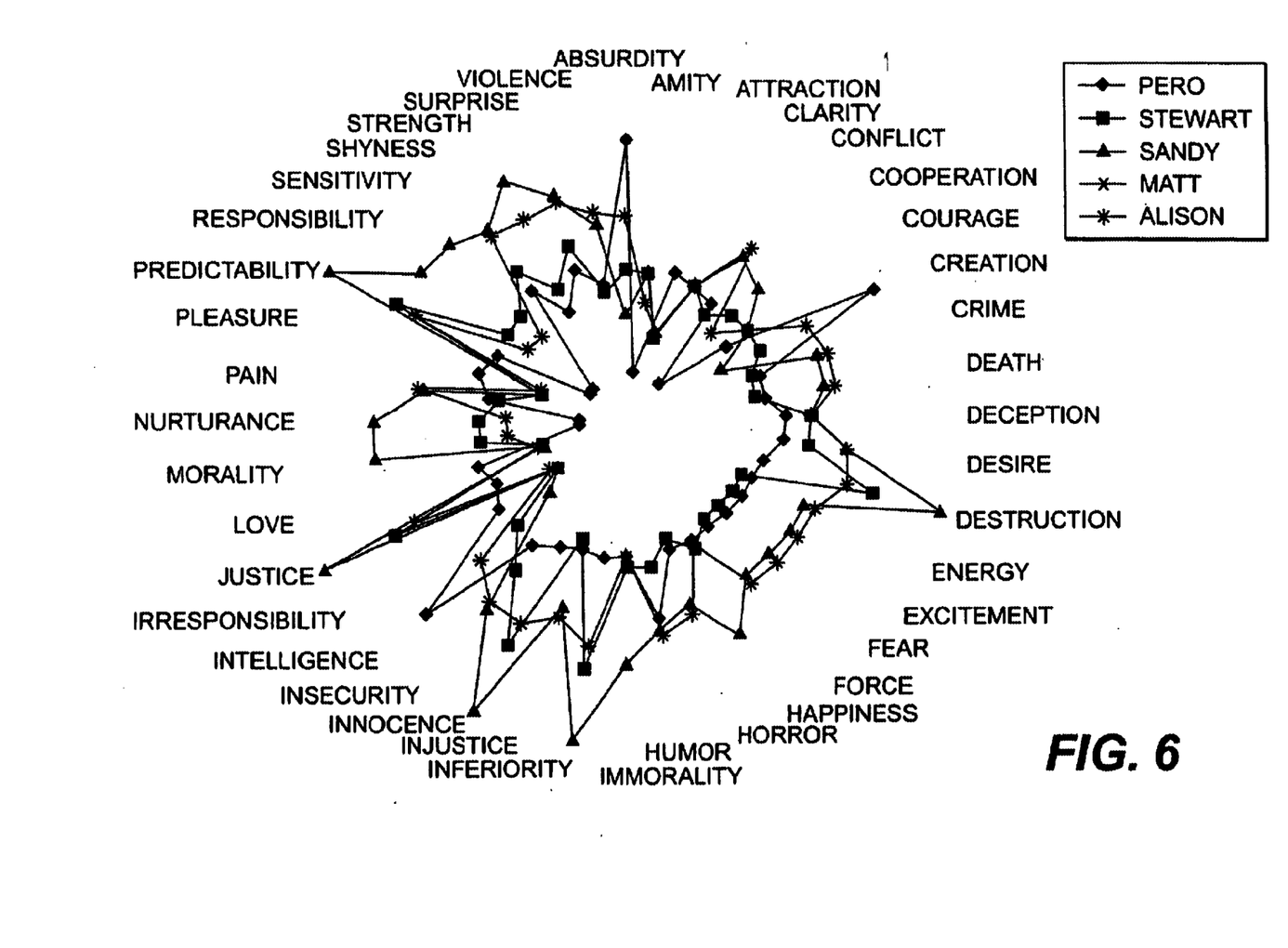
FIG. 6 is a diagram illustrating visualization of the affect analysis according to one embodiment of the present invention.

Assigning centralities to affect categories in a query can be carried out using visualization with polygons, which is the same as visual query definition. For example, a query $$\frac{humor}{0.7} + \frac{excitement}{0.6} + \frac{intelligence}{0.7} + \frac{fear}{0.4} + \frac{love}{0.8}$$

would be represented as a pentagon, as shown in FIG. 5. Affect category space with attached centralities can be visualized in a number of ways because, among other reasons, centrality and intensity have been quantified. For example, each affect category can be represented as a point on the perimeter of a circle and opposite affect categories placed on opposite sides of the circle with respect to the center point. Since each document is tagged with one or more affect categories, and since centralities are between 0 and 1, each document can be represented as an n-sided polygon. As noted above, FIG. 5 illustrates how the query {humor/0.7+excitement/0.6+intelligence/0.7+fear/0.4+love/0.8} would be represented. Other types of visualization tools include grouping opposite emotional categories according to average values using two or three dimensional maps or a linear arrangement. In particular, FIG. 6 illustrates a visualization of five different personal affect category profiles resulting from a movie preference list. This visualization of the affect categories illustrates how different persons react to the same information. Radar charts are particularly useful for this visualization although other types of charts may be used. From the radar chart of FIG. 6, affects with higher centrality are easily visible. Such a chart is useful for observing individual affect categories for a certain person or comparison of affect categories for different persons.

While this invention has been particularly described and illustrated with reference to a preferred embodiment, it will be understood by one of skill in the art that changes in the above description or illustrations may be made with respect to form or detail without departing from the spirit and scope of the invention.

We claim:

1. A method for retrieving information from a data source, comprising the steps of:
    selecting at least one document;
    parsing said document into a plurality of words;
    creating an initial affect set for said document by comparing said words to an affect lexicon and assigning an affect category, a centrality and an intensity to each of said words found in said affect lexicon; and
    using said affect set to retrieve information from said data source.

2. A method, as in claim 1, further comprising:
    combining a plurality of different centralities and intensities associated with different words corresponding to an affect category of a document; and
    using said combined centralities and intensities to retrieve information from said data source.

3. A method, as in claim 2, further comprising:
    combining a plurality of centralities by computing the fuzzy union of all centralities corresponding to an affect category and combining a plurality of intensities by computing the average of all intensities corresponding to an affect category.

4. A method, as in claim 3, further comprising:
    determining the number of words corresponding to each affect category and its average of all intensities to compute the overall affect intensity for a document.

5. A method of retrieving information from a data source, comprising the steps of:
    receiving a request for information from a communications network;
    selecting a data source based on said request;
    selecting at least one document from said data source;
    parsing said document into a plurality of words;
    creating an initial affect set for said document by comparing said words to an affect lexicon and assigning an affect category, a centrality and an intensity to each of said words; and
    using said affect set to retrieve information from said data source.

6. A method, as in claim 5, further comprising:
    combining a plurality of different centralities and intensities associated with different words corresponding to an affect category of a document; and
    using said combined centralities and intensities to retrieve information from said data source.

7. A method, as in claim 6, further comprising:
    combining a plurality of centralities by computing the fuzzy union of all centralities corresponding to an affect category and combining a plurality of intensities by computing the average of all intensities corresponding to an affect category.

8. A method, as in claim 7, further comprising:
    determining the number of words corresponding to each affect category and its average of all intensities to compute the overall affect intensity for a document.

9. A method of retrieving information from a data source, comprising the steps of:
    receiving a request for information from a communications network;
    parsing said request into a plurality of words;
    creating an initial affect set for said document by comparing said words to an affect lexicon and assigning an affect category, a centrality and an intensity to each of said words; and
    using said affect set to retrieve information from said data source.

10. A method, as in claim 9, further comprising:
    combining a plurality of different centralities and intensities associated with different words corresponding to an affect category of a request; and
    using said combined centralities and intensities to retrieve information from said data source.

11. A method, as in claim 9, further comprising:
    combining a plurality of centralities by computing the fuzzy union of all centralities corresponding to an affect category and combining a plurality of intensities by computing the average of all intensities corresponding to an affect category.

12. A method, as in claim 11, further comprising:
    determining the number of words corresponding to each affect category and its average of all intensities to compute the overall affect intensity for a request.

13. A method of retrieving information from a data source, comprising the steps of:
    receiving a request for information;
    parsing said request into a plurality of words;
    creating an initial affect set for said document by comparing said words to an affect lexicon and assigning an affect category, a centrality and an intensity to each of said words; and
    using said affect set to retrieve information from said data source.

14. A method, as in claim 13, further comprising:
    combining a plurality of different centralities and intensities associated with different words corresponding to an affect category of a request; and
    using said combined centralities and intensities to retrieve information from said data source.

15. A method, as in claim 14, further comprising:
    combining a plurality of centralities by computing the fuzzy union of all centralities corresponding to an affect category and combining a plurality of intensities by computing the average of all intensities corresponding to an affect category.

16. A method, as in claim 15, further comprising:
    determining the number of words corresponding to each affect category and its average of all intensities to compute the overall affect intensity for a request.

17. A method of determining affect associated with a text passage, comprising the steps of:
    selecting a text passage;
    parsing said text passage into a plurality of words;
    creating an initial affect set by comparing said words to an affect lexicon and assigning an affect category, a centrality and an intensity to each of said parsed words;
    creating an modified affect set by combining a plurality of different centralities and intensities associated with different words corresponding to an affect category of said text passage; and using said modified affect set to determine said affect of said text passage.

18. A method, as in claim 17, wherein:

said text passage consists of a sentence.

19. A method, as in claim 17, wherein:

said text passage consists of a paragraph.

20. A method, as in claim 17, wherein:

said text passage consists of a document.

21. A method, as in claim 17, wherein:

said text passage consists of a plurality of documents.

* * * * *